US012477014B2

(12) United States Patent
Cho et al.

(10) Patent No.: US 12,477,014 B2
(45) Date of Patent: Nov. 18, 2025

(54) ELECTRONIC DEVICE FOR DETERMINING CALL TYPE WITH EXTERNAL ELECTRONIC DEVICE AND METHOD THEREOF

(71) Applicant: Samsung Electronics Co., Ltd., Suwon-si (KR)

(72) Inventors: Jungil Cho, Suwon-si (KR); Woojin Park, Suwon-si (KR); Jaewoo Seo, Suwon-si (KR); Choonghoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 411 days.

(21) Appl. No.: 18/154,377

(22) Filed: Jan. 13, 2023

(65) Prior Publication Data
US 2023/0231889 A1     Jul. 20, 2023

Related U.S. Application Data

(63) Continuation of application No. PCT/KR2023/000691, filed on Jan. 13, 2023.

(30) Foreign Application Priority Data
Jan. 14, 2022  (KR) .................. 10-2022-0005970

(51) Int. Cl.
*H04L 12/66* (2006.01)
*H04L 65/1069* (2022.01)
(Continued)

(52) U.S. Cl.
CPC ...... *H04L 65/1069* (2013.01); *H04L 65/1101* (2022.05)

(58) Field of Classification Search
CPC ............ H04L 65/1104; H04L 65/1069; H04L 65/1016; H04L 65/1045; H04L 65/1083; G06F 1/3209
See application file for complete search history.

(56) References Cited

U.S. PATENT DOCUMENTS

| 6,947,532 B1 | 9/2005 | Marchand et al. |
| 10,681,221 B1 | 6/2020 | Lesage et al. |
| (Continued) | | |

FOREIGN PATENT DOCUMENTS

| CN | 111601007 A | 8/2020 |
| JP | 2012-520644 A | 9/2012 |
| (Continued) | | |

OTHER PUBLICATIONS

International Search Report dated Apr. 20, 2023, issued in International Application No. PCT/KR2023/000691.

*Primary Examiner* — Kharye Pope
(74) *Attorney, Agent, or Firm* — Jefferson IP Law, LLP

(57) ABSTRACT

According to an embodiment of the disclosure, an electronic device is provided. The electronic device includes a communication module and at least one processor connected to the communication module. The at least one processor is configured to configure a call setup with an external electronic device through the communication module. The at least one processor is configured to control the communication module to transmit at least one request message based on a first protocol through the communication module, and receive at least one response message corresponding to the request message. The at least one processor is configured to control the communication module to transmit a howling generation sound source through the communication module, and receive a howling response corresponding to the howling generation sound source. The at least one processor (Continued)

is configured to determine whether a call between the electronic device and the external electronic device is a normal call.

20 Claims, 12 Drawing Sheets

(51) Int. Cl.
   *H04L 65/1101* (2022.01)
   *H04M 3/00* (2024.01)
   *H04M 5/00* (2006.01)

(56) References Cited

U.S. PATENT DOCUMENTS

| | | | |
|---|---|---|---|
| 10,931,818 | B1 | 2/2021 | Broadworth et al. |
| 10,979,565 | B1* | 4/2021 | Piscopo, Jr. .......... H04W 80/10 |
| 2006/0250988 | A1* | 11/2006 | Garcia ............... H04L 65/1101 370/260 |
| 2007/0165811 | A1 | 7/2007 | Reumann et al. |
| 2008/0285468 | A1 | 11/2008 | Seo et al. |
| 2011/0258489 | A1* | 10/2011 | Nielsen ................. H04M 1/24 714/28 |
| 2012/0039452 | A1 | 2/2012 | Horn et al. |
| 2016/0142412 | A1 | 5/2016 | Jang et al. |
| 2017/0223062 | A1* | 8/2017 | Jing ................... H04L 65/1104 |
| 2018/0139329 | A1* | 5/2018 | Hsu ...................... H04M 1/006 |
| 2020/0097142 | A1 | 3/2020 | Kim |
| 2020/0382638 | A1 | 12/2020 | Yun |
| 2020/0396616 | A1 | 12/2020 | Edman et al. |
| 2021/0012766 | A1 | 1/2021 | Kim et al. |
| 2021/0320944 | A1* | 10/2021 | Ogle .................... H04W 12/009 |
| 2021/0385320 | A1 | 12/2021 | Nakarmi et al. |
| 2021/0392173 | A1* | 12/2021 | Chen ...................... G06N 20/00 |

FOREIGN PATENT DOCUMENTS

| | | |
|---|---|---|
| KR | 10-2004-0044786 A | 5/2004 |
| KR | 10-2007-0077062 A | 7/2007 |
| KR | 10-2008-0100918 A | 11/2008 |
| KR | 10-2010-0034289 A | 4/2010 |
| KR | 10-2010-0103757 A | 9/2010 |
| KR | 10-2010-0136709 A | 12/2010 |
| KR | 10-2011-0057283 A | 6/2011 |
| KR | 10-2012-0133436 A | 12/2012 |
| KR | 10-2013-0052297 A | 5/2013 |
| KR | 10-2013-0082953 A | 7/2013 |
| KR | 10-1295442 B1 | 8/2013 |
| KR | 10-2013-0097361 A | 9/2013 |
| KR | 10-2014-0003945 A | 1/2014 |
| KR | 10-2014-0011751 A | 1/2014 |
| KR | 10-2014-0023714 A | 2/2014 |
| KR | 10-2014-0030826 A | 3/2014 |
| KR | 10-1379779 B1 | 4/2014 |
| KR | 10-2014-0070880 A | 6/2014 |
| KR | 10-1416447 B1 | 7/2014 |
| KR | 10-2014-0122370 A | 10/2014 |
| KR | 10-1494970 B1 | 2/2015 |
| KR | 10-2015-0077698 A | 7/2015 |
| KR | 10-2015-0106100 A | 9/2015 |
| KR | 10-2015-0132892 A | 11/2015 |
| KR | 10-2015-0140558 A | 12/2015 |
| KR | 10-2016-0011120 A | 1/2016 |
| KR | 10-2016-0019157 A | 2/2016 |
| KR | 10-2016-0110791 A | 9/2016 |
| KR | 10-2016-0115407 A | 10/2016 |
| KR | 10-2016-0148160 A | 12/2016 |
| KR | 10-2017-0016114 A | 2/2017 |
| KR | 10-2017-0016115 A | 2/2017 |
| KR | 10-2017-0061575 A | 6/2017 |
| KR | 10-2017-0062726 A | 6/2017 |
| KR | 10-2017-0077381 A | 7/2017 |
| KR | 10-2019-0115082 A | 10/2019 |
| KR | 10-2019-0123362 A | 11/2019 |
| KR | 10-2019-0125856 A | 11/2019 |
| KR | 10-2020-0023092 A | 3/2020 |
| KR | 10-2123103 B1 | 6/2020 |
| KR | 10-2020-0081950 A | 7/2020 |
| KR | 10-2197596 B1 | 1/2021 |
| KR | 10-2199831 B1 | 1/2021 |

\* cited by examiner

ELECTRONIC DEVICE FOR DETERMINING CALL TYPE WITH EXTERNAL ELECTRONIC DEVICE AND METHOD THEREOF

CROSS-REFERENCE TO RELATED APPLICATION(S)

This application is a continuation application, claiming priority under § 365(c), of an International application No. PCT/KR2023/000691, filed on Jan. 13, 2023, which is based on and claims the benefit of a Korean patent application number 10-2022-0005970, filed on Jan. 14, 2022, in the Korean Intellectual Property Office, the disclosure of each of which is incorporated by reference herein in its entirety.

TECHNICAL FIELD

The disclosure relates to an electronic device for determining the type of a call with an external electronic device, and an operating method thereof.

BACKGROUND ART

With the development of network and electronic technologies, the number of subscribers to wireless Internet networks is increasing at an explosive rate, and various services are being provided through the networks.

Among the services through the networks, an Internet phone service, that is, a voice over internet protocol (VoIP) service, which has a low call rate and enables a multimedia call, has been developed and provided. The VoIP service provides a call service by establishing a call, based on signaling protocols, such as H.323, session initiation protocol (SIP), media gateway control protocol (MGCP), and media gateway control (MEGACO), and exchanging packets (real-time transport protocol (RTP) packets) including voice and video information in real time, based on a protocol, such as RTP.

The VoIP service may establish a call between various internet protocol (IP) terminals (e.g., a SIP-supporting terminal and a personal computers) capable of accessing a network, thereby enabling RTP packets to be exchanged through the network.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

The disclosure provides a method for an electronic device to identify the type of a call with an external electronic device and to determine whether the call between the electronic device and the external electronic device is a normal call.

Technical Solution

According to an embodiment of the disclosure, an electronic device may includes a communication module and at least one processor connected to the communication module. The at least one processor is configured to configure a call setup with an external electronic device through the communication module, control to transmit at least one request message based on a first protocol through the communication module, receive at least one response message corresponding to the request message, and identify a first response time, based on a transmission time of the at least one request message and a reception time of the at least one response message. The at least one processor is configured to control to transmit a howling generation sound source through the communication module, receive a howling response corresponding to the howling generation sound source, and identify a second response time, based on a transmission time of the howling generation sound source and a reception time of the howling response. d The at least one processor is configured to determine whether a call between the electronic device and the external electronic device is a normal call, based on the first response time and the second response time.

According to an embodiment of the disclosure, an method performed by an electronic device is provided. The method includes configuring a call setup with an external electronic device, transmitting at least one request message based on a first protocol and receiving at least one response message corresponding to the request message, and identifying a first response time, based on a transmission time of the at least one request message and a reception time of the at least one response message. The method includes transmitting a howling generation sound source and receiving a howling response corresponding to the howling generation sound source, and identifying a second response time, based on a transmission time of the howling generation sound source and a reception time of the howling response. The method includes determining whether a call between the electronic device and the external electronic device is a normal call, based on the first response time and the second response time.

Advantageous Effects

An electronic device according to various embodiments of the disclosure may easily determine whether a call between the electronic device and an external electronic device is a normal call.

An electronic device according to various embodiments of the disclosure may efficiently detect voice phishing using a gateway from abroad.

BRIEF DESCRIPTION OF DRAWINGS

The above and other aspects, features, and advantages of certain embodiments of the disclosure will be more apparent from the following description taken in conjunction with the accompanying drawings, in which.

MODE FOR CARRYING OUT THE INVENTION

Figure 1:
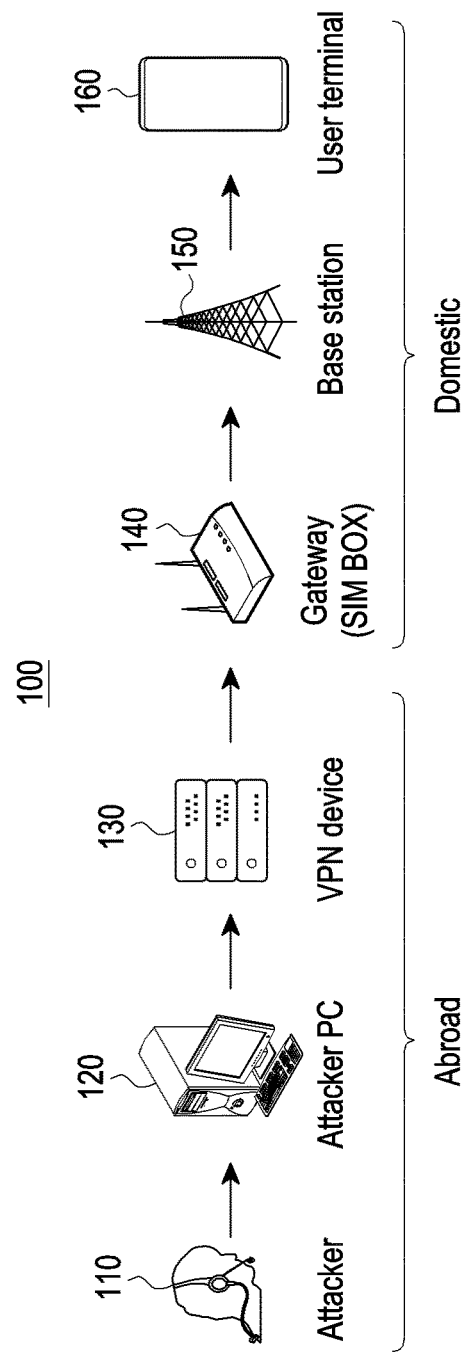
FIG. 1 is a diagram illustrating a system including a user terminal according to an embodiment of the disclosure.

Hereinafter, various embodiments of the disclosure will be described in detail with reference to the accompanying drawings. In describing various embodiments of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

It should be noted that the technical terms used herein are only used to describe specific embodiments, and are not intended to limit the disclosure. Further, the technical terms used herein should be interpreted to have the same meaning as those commonly understood by a person skilled in the art to which the disclosure pertains, and should not be interpreted have excessively comprehensive or excessively restricted meanings unless particularly defined as other meanings. Further, when the technical terms used herein are wrong technical terms that cannot correctly represent the idea of the disclosure, it should be appreciated that they are replaced by technical terms correctly understood by those skilled in the art. Alternatively, the general terms used herein should be interpreted as defined in dictionaries or interpreted in the context of the relevant part, and should not be interpreted to have excessively restricted meanings.

Alternatively, a singular expression used herein may include a plural expression unless they are definitely different in the context. As used herein, such an expression as "comprises" or "include" should not be interpreted to necessarily include all elements or all steps described in the specification, and should be interpreted to be allowed to exclude some of them or further include additional elements or steps.

Alternatively, the terms including an ordinal number, such as expressions "a first" and "a second" may be used to described various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, exemplary embodiments of the disclosure will be described in detail with reference to the accompanying drawings. Regardless of drawing signs, the same or like elements are provided with the same reference numeral, and a repeated description thereof will be omitted. In describing the disclosure, descriptions related to technical contents well-known in the art and not associated directly with the disclosure will be omitted. Alternatively, it should be noted that the accompanying drawings are presented merely to help easy understanding of the disclosure, and are not intended to limit the disclosure. The technical idea of the disclosure should be construed to cover all changes, equivalents, and alternatives, in addition to the drawings.

FIG. 1 is a diagram illustrating a system including a user terminal according to an embodiment of the disclosure.

Referring to FIG. 1, the system 100 may include an attacker personal computer (PC) 120 used by an attacker 110, a virtual private network (VPN) device 130, a gateway (e.g., SIMBOX) 140, and a base station 150, and an electronic device (e.g., the user terminal 160).

According to various embodiments, the attacker 110 to commit a criminal act, such as voice phishing, may make a call (e.g., an Internet call) to the user terminal 160 located domestically by using the attacker PC 120 and the VPN device 130 located abroad and the gateway 140 located domestically. The attacker 110 may input a voice signal for an Internet call (or voice over Internet protocol (VoIP)) to the attacker PC 120 by using a communication device (e.g., a headset).

The VPN device 130 refers to a relay device enabling a public network, such as the Internet network, to be used as a private network, and enables the attacker 110 to define an own network configuration and to establish an arbitrary phone number system. The VPN device 130 may transmit an Internet call voice of the attacker 110 to the gateway 140 through the established arbitrary phone number system.

The gateway 140 may be configured as a SIMBOX, and may be a device forging an incoming call number. The gateway 140 may process an Internet call (or VoIP) originating from the attacker PC 120 abroad to look like a domestic call (e.g., in the case of calling into South Korea, a call from a phone number starting with '010'). The gateway 140 may transmit the attacker 110's Internet call (or VoIP) voice to the base station 150 by using a forged phone number starting with 010 (hereinafter, referred to as a '010 phone number' for convenience of description).

The base station 150 is an entity performing radio resource allocation of the user terminal 160, and may include at least one of a radio access network (RAN), an eNode B, a gNode B, a Node B, a base station (BS), a next-generation radio access network (NG-RAN), a fifth generation access network (5G-AN), a radio access unit, a base station controller, or a node on a network. According to various embodiments, the base station 150 may transmit the attacker 110's Internet call (or VoIP) voice to the user terminal 160 through the 010 phone number forged by the gateway 140. According to various embodiments, the base station 150 may relay the Internet call (or VoIP) between the user terminal 160 and the attacker PC 120.

The user terminal 160 may include at least one of a user equipment (UE), a next-generation UE (NG UE), a mobile station (MS), a cellular phone, a smartphone, or a computer. The user terminal 160 may include a multimedia system capable of performing a communication function.

Figure 2:
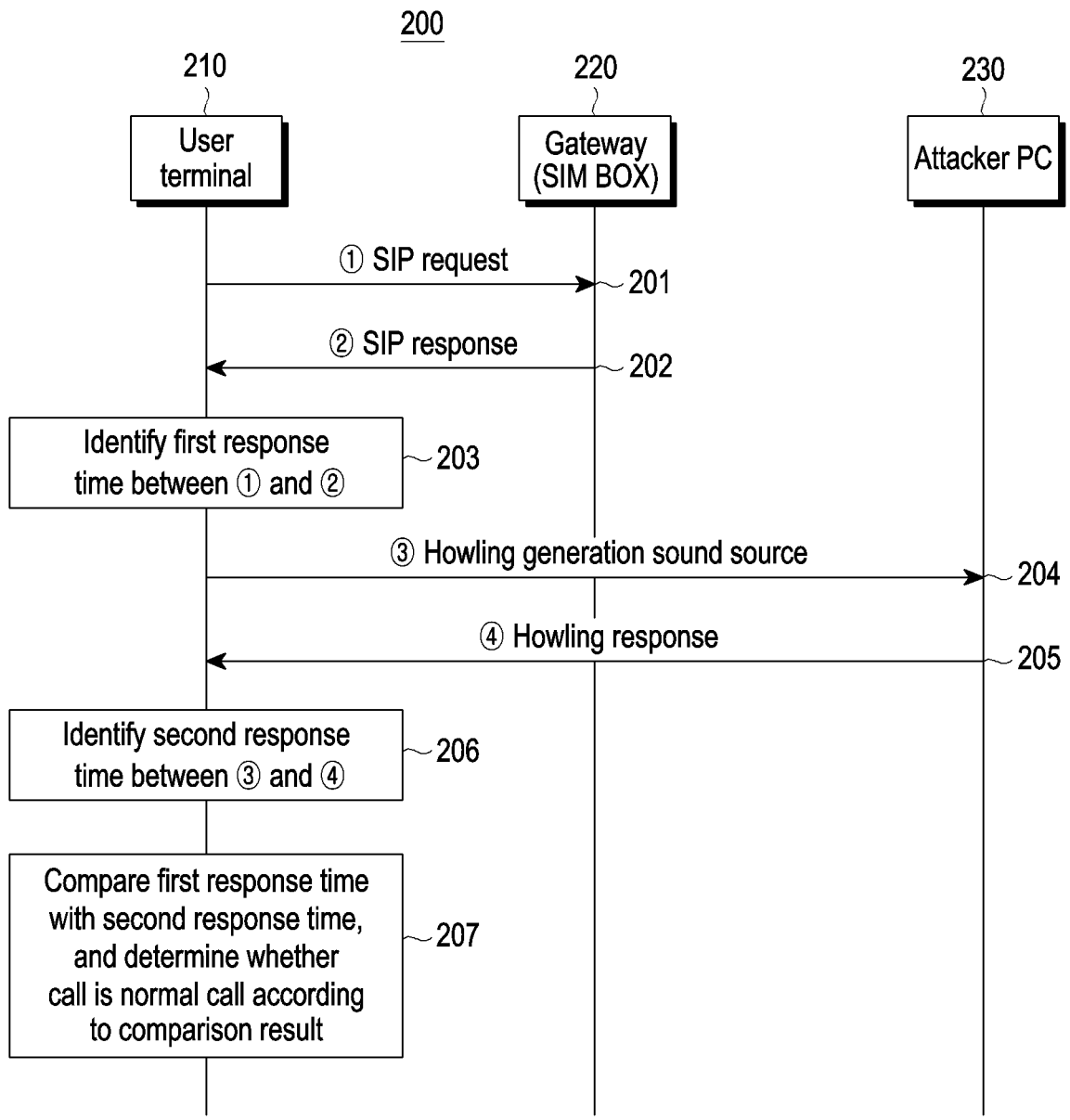
FIG. 2 is a flowchart illustrating a process in which a user terminal determines whether a normal call is made according to an embodiment of the disclosure.

FIG. 2 is a flowchart illustrating a process in which a user terminal determines whether a normal call is made according to an embodiment of the disclosure.

Referring to FIG. 2, a system 200 for determining whether a normal call is made may include a user terminal 210, a gateway (SIMBOX) 220, and an attacker PC 230. For example, the user terminal 210 may be configured as the user terminal 160 of FIG. 1, the gateway 220 may be configured as the gateway (SIMBOX) 140 of FIG. 1, and the attacker PC 230 may be configured as the attacker PC 120 of FIG. 1.

A call setup between the user terminal 210 and the gateway (SIMBOX) 220 may be implemented through a session initiation protocol (SIP). A session may be a session related to multimedia. The SIP may configure a connection over a voice over Internet protocol (VoIP), and subsequent data transmission may be processed by another protocol (e.g., real-time transport protocol (RTP)). According to various embodiments, after the data transmission through the RTP is completed, the SIP may configure termination of the connection over the VoIP.

An Internet call (or VoIP) made by the attacker PC 230 may be forged into a domestic call (e.g., a call from a phone number starting with '010') by the gateway (SIMBOX) 220. The gateway (SIMBOX) 220 may transmit a SIP INVITE message to the user terminal 210 for a call setup, and the user terminal 210 may transmit a response message corresponding to the SIP INVITE message to the gateway (SIMBOX) 220.

After the call setup through the SIP, the user terminal 210 may transmit a SIP request message ① to the gateway (SIMBOX) 220 (201). The SIP request message ① may be configured as a SIP option message, and the SIP option message may be a message transmitted to identify a capability of a counterpart terminal When the SIP request message ① 0 is configured as the SIP option message, the SIP request message ① may be transmitted to the gateway (SIMBOX) 220 before the call setup through the SIP.

The SIP request message ① 0 is configured as a dummy message transmitted through the SIP, and may be used as a message for measuring a total time when the SIP message is transmitted and received between the user terminal 210 and the gateway (SIMBOX) 220.

The gateway (SIMBOX) 220 may transmit a response message (SIP response message) ② to the SIP request message ① 0 to the user terminal 210 (202). When the SIP request message ① 0 is configured as the SIP option message, the SIP response message ② 0 may be configured as a SIP option response message. When the SIP request message ① 0 is configured as the dummy message, the SIP response message ② may be configured as a dummy response message.

The user terminal 210 may identify a first response time, which is a time from when transmitting the SIP request message ① 0 to when receiving the SIP response message ② 0 (203). The user terminal 210 may determine a time when the SIP messages are transmitted and received between the user terminal 210 and the gateway (SIMBOX) 220, based on identifying the first response time.

The user terminal 210 may transmit an RTP request message through the RTP to the gateway (SIMBOX) 220 instead of the SIP request message ①, and the gateway (SIMBOX) 220 may transmit an RTP response message through the RTP to the user terminal 210 instead of the SIP response message ②.

The user terminal 210 may identify the first response time, which is a time from when transmitting the RTP request message to when receiving the RTP response message. The user terminal 210 may determine a time when the RTP messages are transmitted and received between the user terminal 210 and the gateway (SIMBOX) 220, based on identifying the first response time.

The user terminal 210 may transmit a howling generation sound source ③ to the attacker PC 230 making the Internet call (or VoIP) (204). The howling generation sound source ③ may be a sound source having a unique period of 16,000 Hz or higher, but is not limited to this numerical value. The howling generation sound source ③ may generate an echo in the attacker PC 230.

The attacker PC 230 may transmit a response message (howling response message) ④ to the howling generation sound source ③ to the user terminal 210 (205). The howling response message ④ may include a signal in which the howling generation sound source ③ having the unique period of 16,000 Hz or higher transmitted to the attacker PC 230 returns to the user terminal 210 again. For example, the howling response message ④ may be input through a microphone provided in the attacker PC 230 and transmitted to the user terminal 210.

According to various embodiments, the user terminal 210 may identify a second response time, which is a time from when transmitting the howling generation sound source ③ to when receiving the howling response message ④ (206). The user terminal 210 may determine a total time when the sound source is transmitted and received between the user terminal 210 and the attacker PC 230, based on identifying the second response time. The second response time may be adjusted in view of a delay according to a characteristic of the howling generation sound source ③ and a delay in a codec used in the voice over long term evolution (VoLTE).

The user terminal 210 may compare the first response time identified in operation 203 with the second response time identified in operation 206, and may determine whether the call is a normal call according to a comparison result (207). When the second response time between ③ and ④ is greater than the first response time between ① and ② by a threshold value or greater, the user terminal 210 may determine that the call performed between the user terminal 210 and the attacker PC 230 is an abnormal call (e.g., a call by voice phishing). The threshold value may be configured based on a transmission delay on a network.

When a difference between the second response time between ③ and ④ and the first response time between ② and ② is less than the threshold value, the user terminal 210 may determine that the call performed between the user terminal 210 and the attacker PC 230 is a normal call. The threshold value may be configured based on the transmission delay on the network.

When the attacker PC 230 makes the Internet call (or VoIP) to the user terminal 210, the second response time between ③ and ④ is greater than the first response time between ① and ② by the threshold value or greater. When the attacker PC 230 makes the Internet phone call (or VoIP) to the user terminal 210, an entire connection section taking the first response time between ① and ② occurs domestically, while part of a connection section taking the second response time between ③ and ④ may occur abroad.

For example, a process in which the user terminal 210 compares the first response time with the second response time and determines whether the call is the normal call according to the comparison result may be performed through the following algorithm.

```
If call setup is complete,
// Measure SIP delay
Msg = Create(SIP Option Message)
Sip_time1 = Send(Msg)
Sip_time2 = Receive(SIP Option Response)
SIPDelay = Sip_time2 - Sip_time1
// Measure howling sound delay
Snd = Create(Low Frequency + Periodic Sound)
Snd_time1 = Send(Snd)
Snd_time2 = Receive(Howling Sound)
SndDelay = Snd_time2 - Snd_time1 - mEchoDelay -mCodecDelay
if (SndDelay - SIPDelay > Threshold)
Voice Phishing
Else
Normal Call
```

Msg may be the SIP request message ① 0, and Sip_time1 may be the transmission time of the Msg. SIP Option Response may be the SIP response message ②, and Sip_time2 may be the reception time of SIP Option Response. SIPDelay may refer to a difference between Sip_time2 and Sip_time1.

Snd may be the howling generation sound source ③, and Snd_time1 may be the transmission time of the howling-generated sound source ③. Snd_time2 may be the reception time of the howling response message ④. mEchoDelay may be configured differently depending on a howling-inducing sound source, and mCodecDelay may be the delay (e.g., 25 ms) in the codec used in the VoLTE. Threshold may be configured based on a transmission delay (e.g., 32 ms) of a network terminal.

Figure 3A:
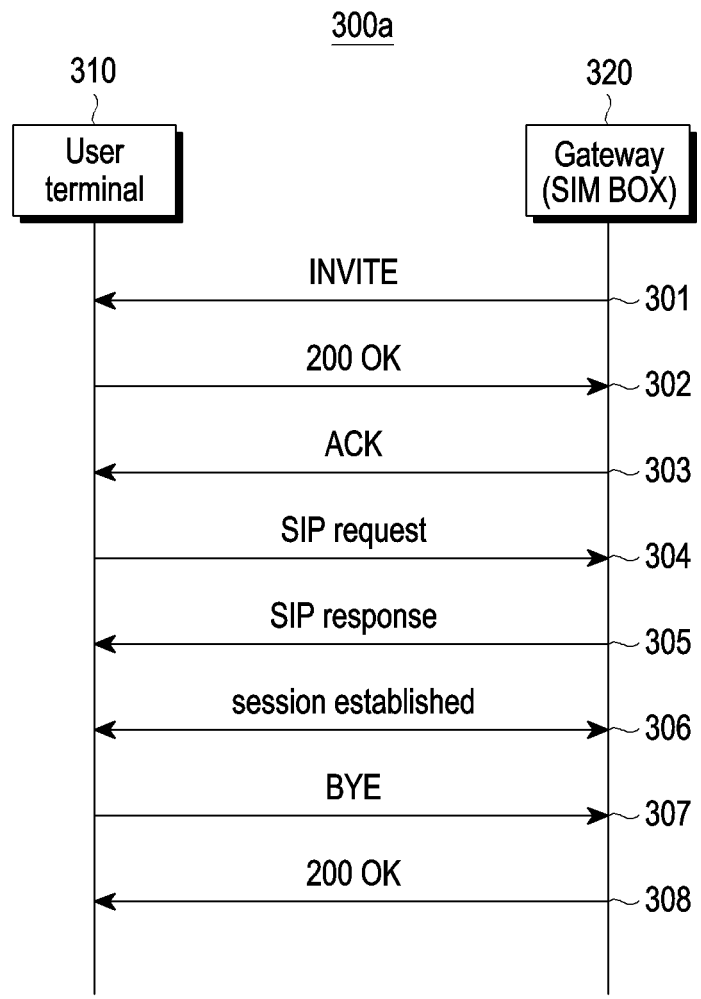
FIG. 3A is an example of a flowchart illustrating a SIP signaling process between a user terminal and a gateway according to an embodiment of the disclosure.

FIG. 3A is an example of a flowchart illustrating a SIP signaling process between a user terminal and a gateway according to an embodiment of the disclosure.

Referring to FIG. 3A, a system 300a for SIP signaling may include a user terminal 310 and a gateway (SIMBOX) 320. The user terminal 310 may be configured as the user terminal 160 of FIG. 1 or the user terminal 210 of FIG. 2. The gateway (SIMBOX) 320 may be configured as the gateway (SIMBOX) 140 of FIG. 1 or the gateway (SIMBOX) 220 of FIG. 2. The system 300a may further include a SIP server that performs a relay between the user terminal 310 and the gateway (SIMBOX) 320.

The user terminal 310 may receive an INVITE message from the gateway (SIMBOX) 320 through the SIP (301). The user terminal 310 may transmit a 200 OK message indicating that a call is received to the gateway (SIMBOX) 320 in response to the INVITE message (302). The user terminal 310 may receive an ACK message from the gateway (SIMBOX) 320 in response to the 200 OK message (303).

The user terminal 310 may transmit a SIP request message to the gateway (SIMBOX) 320 to determine a transmission and reception time of a SIP message between the user terminal 310 and the gateway (SIMBOX) 320 (304). The SIP request message may be the same as or similar to the SIP request message ① of FIG. 2. Although FIG. 3A shows that the SIP request message is transmitted after operation 303 for convenience of description, the SIP request message may be transmitted before a call setup (i.e., before operation 301).

The user terminal 310 may receive a SIP response message as a response to the SIP request message from the gateway (SIMBOX) 320 (305). The user terminal 310 may identify a response time from transmission of the SIP request message to reception of the SIP response message.

The user terminal 310 and the gateway (SIMBOX) 320 may establish a session (306). The user terminal 310 may communicate with the gateway (SIMBOX) 320 through the RTP after establishing the session.

The user terminal 310 may transmit a BYE message to the gateway (SIMBOX) 320 through the SIP when a call is terminated (307). The gateway (SIMBOX) 320 may transmit a 200 OK message to the user terminal 310 in response to the BYE message. Although FIG. 3A shows that the user terminal 310 terminates the call and transmits the BYE message to the gateway (SIMBOX) 320 for convenience of description, the gateway (SIMBOX) 320 may terminate the call and may transmit a BYE message to the user terminal 310. The gateway 320 may receive the BYE message, and may transmit the 200 OK message to the user terminal 310 in response to the BYE message (308).

Figure 3B:
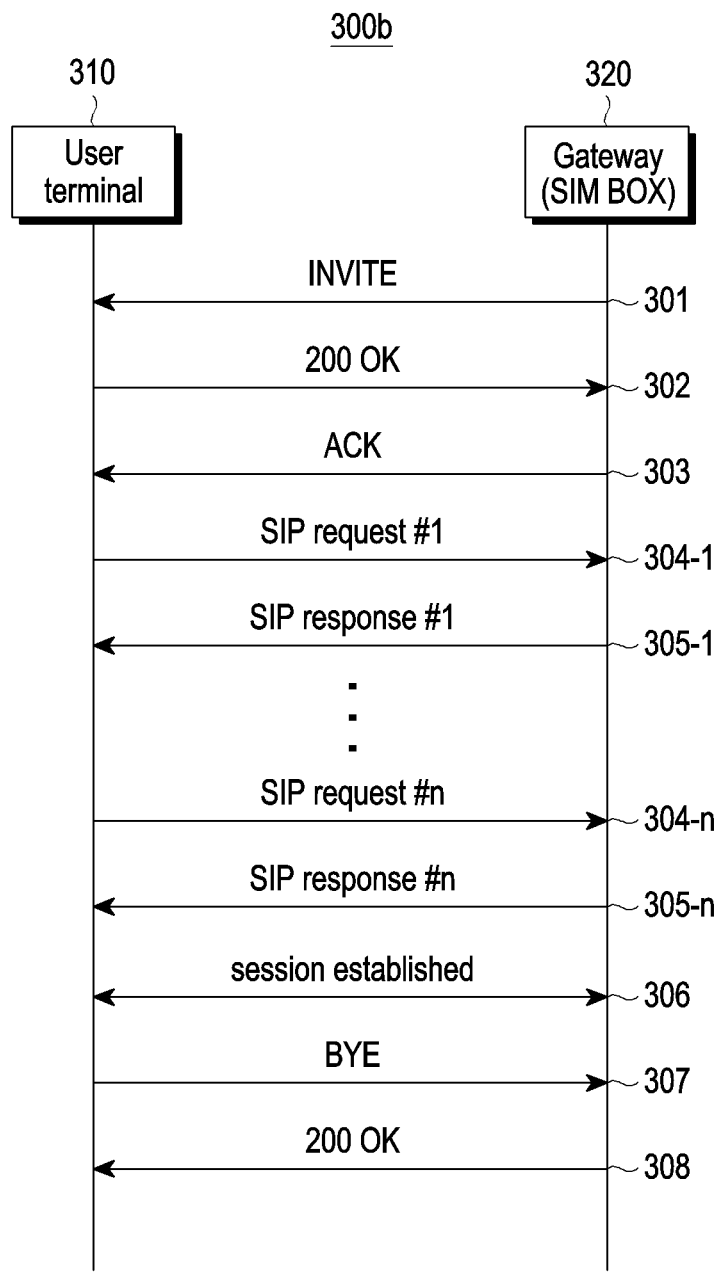
FIG. 3B is another example of a flowchart illustrating a SIP signaling process between a user terminal and a gateway according to an embodiment of the disclosure.

FIG. 3B is another example of a flowchart illustrating a SIP signaling process between a user terminal and a gateway according to an embodiment of the disclosure.

Referring to FIG. 3B, a system 300b for SIP signaling may include a user terminal 310 and a gateway (SIMBOX) 320. The user terminal 310 may be configured as the user terminal 160 of FIG. 1 or the user terminal 210 of FIG. 2. The gateway (SIMBOX) 320 may be configured as the gateway (SIMBOX) 140 of FIG. 1 or the gateway (SIMBOX) 220 of FIG. 2. According an embodiment of the disclosure (not shown), the system 300b may further include a SIP server that performs a relay between the user terminal 310 and the gateway (SIMBOX) 320.

Since operations 301 to 303 and operations 306 to 308 illustrated in FIG. 3B are the same as or substantially the same as those described above in FIG. 3A, a description thereof will be omitted. Although FIG. 3A shows that the user terminal 310 and the gateway (SIMBOX) 320 transmit and receive one SIP request message and one SIP response message to determine a transmission and reception time of a SIP message, whereas FIG. 3B shows that the user terminal 310 and the gateway (SIMBOX) 320 may transmit and receive a plurality of SIP request messages and a plurality of SIP response messages to determine a transmission and reception time of a SIP message.

The user terminal 310 may transmit a first SIP request message to the gateway (SIMBOX) 320 (304-1), and may receive a first SIP response message as a response to the first SIP request message from the gateway (SIMBOX) 320 (305-1). The user terminal 310 may transmit an nth SIP request message (where n is a natural number equal to or greater than 2) to the gateway (SIMBOX) 320 (304-n), and may receive an nth SIP response message as a response to the nth SIP request message from the gateway (SIMBOX) 320 (305-n).

Each of the first SIP request message and the nth SIP request message may be the same as or similar to the SIP request message ① of FIG. 2. Although FIG. 3B shows that the first SIP request message and the nth SIP request message are transmitted after operation 303 for convenience of description, the first SIP request message and the nth SIP request message may be transmitted before a call setup (i.e., before operation 301).

Each of the first SIP response message and the nth SIP response message may be the same as or similar to the SIP response message ② of FIG. 2. Although FIG. 3B shows that the first SIP response message and the nth SIP response message are transmitted after operation 303 for convenience of description, the first SIP response message and the nth SIP response message may be transmitted before the call setup (i.e., before operation 301).

The user terminal 310 may identify a first response time from transmission of the first SIP request message to reception of the first SIP response message. The user terminal 310 may identify an nth response time from transmission of the nth SIP request message to reception of the nth SIP response message. The user terminal 310 may calculate an average of the first response time to the nth response time, and may determine a SIP average response time. The user terminal 310 may identify a howling response time, which is a time from transmission of a howling generation sound source (e.g., the howling generation sound source ③ of FIG. 2) to reception of a howling response (e.g., the howling response message ④ of FIG. 2).

The user terminal 310 may compare the SIP average response time and the howling response time, and may determine whether a call is a normal call according to a comparison result. When a difference between the SIP average response time and the howling response time is greater than or equal to a threshold value, the user terminal 310 may determine the call between the user terminal 310 and the gateway (SIMBOX) 320 is an abnormal call (e.g., a call by voice phishing). When the difference between the SIP average response time and the howling response time is less than the threshold value, the user terminal 310 may determine the call between the user terminal 310 and the gateway (SIMBOX) 320 is a normal call.

The user terminal 310 may determine whether the call between the user terminal 310 and the gateway (SIMBOX) 320 is a normal call even during the call or after termination of the call by comparing the SIP average response time and the howling response time.

Figure 3C:
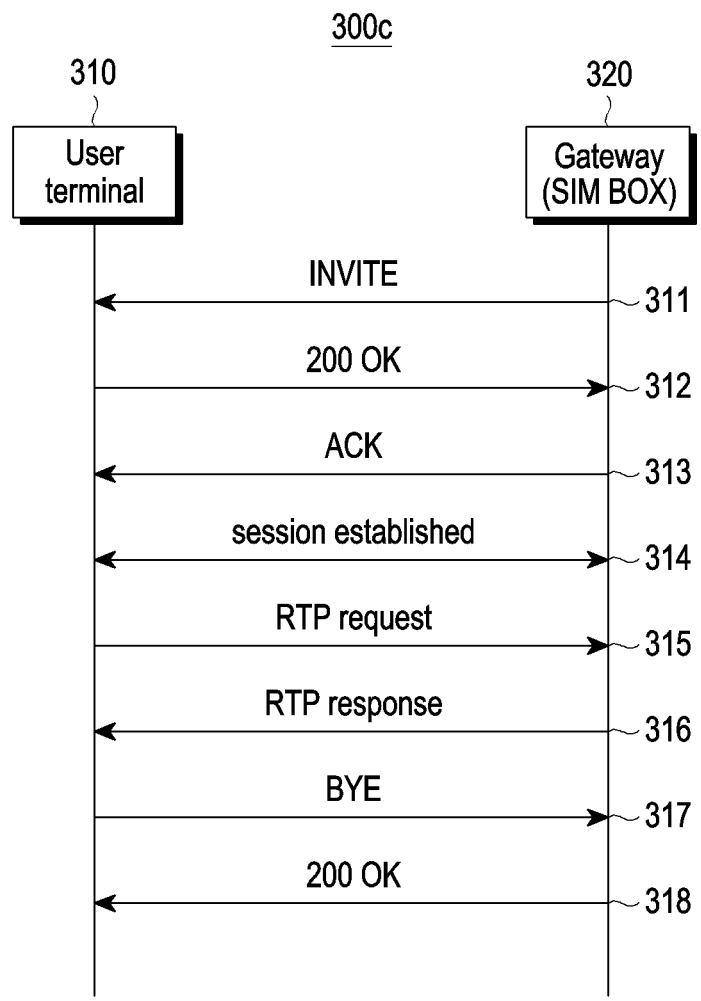
FIG. 3C is an example of a flowchart illustrating a SIP/RTP signaling process between a user terminal and a gateway according to an embodiment of the disclosure.

FIG. 3C is an example of a flowchart illustrating a SIP/RTP signaling process between a user terminal and a gateway according to an embodiment of the disclosure.

Referring to FIG. 3C, a system 300c for SIP/RTP signaling may include a user terminal 310 and a gateway (SIMBOX) 320. The user terminal 310 may be configured as the user terminal 160 of FIG. 1 or the user terminal 210 of FIG. 2. The gateway (SIMBOX) 320 may be configured as the gateway (SIMBOX) 140 of FIG. 1 or the gateway (SIMBOX) 220 of FIG. 2. According to an embodiment of the disclosure (not shown), the system 300c may further include a SIP server and an RTP server that perform a relay between the user terminal 310 and the gateway (SIMBOX) 320.

The user terminal 310 may receive an INVITE message from the gateway (SIMBOX) 320 through the SIP (311). The user terminal 310 may transmit a 200 OK message indicating that a call is received to the gateway (SIMBOX) 320 in response to the INVITE message (312). The user terminal 310 may receive an ACK message from the gateway (SIMBOX) 320 in response to the 200 OK message (313).

The user terminal 310 and the gateway (SIMBOX) 320 may establish a session (314). The user terminal 310 may communicate with the gateway (SIMBOX) 320 through the RTP after establishing the session.

The user terminal 310 may transmit an RTP request message to the gateway (SIMBOX) 320 to determine a transmission and reception time of an RTP message between the user terminal 310 and the gateway (SIMBOX) 320 (315). The user terminal 310 may receive an RTP response message as a response to the RTP request message from the gateway (SIMBOX) 320 (316). The user terminal 310 may identify an RTP response time from transmission of the RTP request message to reception of the SIP response message.

The user terminal 310 may identify the RTP response time from the transmission of the RTP request message to the reception of the RTP response message. The user terminal 310 may identify a howling response time, which is a time from transmission of a howling generation sound source (e.g., the howling generation sound source ③ of FIG. 2) to reception of a howling response (e.g., the howling response message ④ of FIG. 2).

The user terminal 310 may compare the RTP response time and the howling response time, and may determine whether a call is a normal call according to a comparison result. When a difference between the RTP response time and the howling response time is greater than or equal to a threshold value, the user terminal 310 may determine the call between the user terminal 310 and the gateway (SIMBOX) 320 is an abnormal call (e.g., a call by voice phishing). When the difference between the RTP response time and the howling response time is less than the threshold value, the user terminal 310 may determine the call between the user terminal 310 and the gateway (SIMBOX) 320 is a normal call.

The user terminal 310 may determine whether the call between the user terminal 310 and the gateway (SIMBOX) 320 is a normal call even during the call or after termination of the call by comparing the RTP response time and the howling response time.

The user terminal 310 may transmit a BYE message to the gateway (SIMBOX) 320 through the SIP when the call is terminated (317). The gateway (SIMBOX) 320 may transmit a 200 OK message to the user terminal 310 in response to the BYE message. Although FIG. 3C shows that the user terminal 310 terminates the call and transmits the BYE message to the gateway (SIMBOX) 320 for convenience of description, the gateway (SIMBOX) 320 may terminate the call and may transmit a BYE message to the user terminal 310. The gateway 320 may receive the BYE message, and may transmit the 200 OK message to the user terminal 310 in response to the BYE message (318).

Figure 3D:
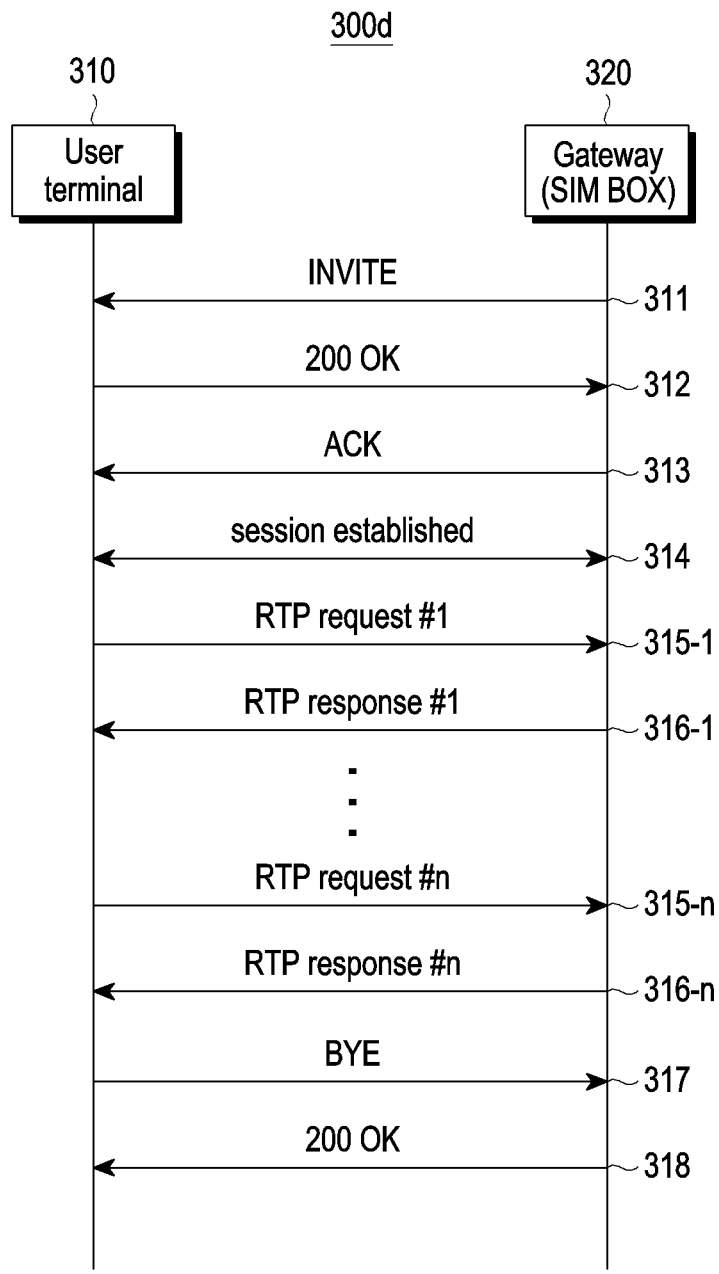
FIG. 3D is another example of a flowchart illustrating a SIP/RTP signaling process between a user terminal and a gateway according to an embodiment of the disclosure.

FIG. 3D is another example of a flowchart illustrating a SIP/RTP signaling process between a user terminal and a gateway according to an embodiment of the disclosure.

Referring to FIG. 3B, a system 300d for SIP/RTP signaling may include a user terminal 310 and a gateway (SIMBOX) 320. The user terminal 310 may be configured as the user terminal 160 of FIG. 1 or the user terminal 210 of FIG. 2. The gateway (SIMBOX) 320 may be configured as the gateway (SIMBOX) 140 of FIG. 1 or the gateway (SIMBOX) 220 of FIG. 2. According to an embodiment of the disclosure (not shown), the system 300d may further include a SIP server and an RTP server that perform a relay between the user terminal 310 and the gateway (SIMBOX) 320.

Since operations 311 to 314 and operations 317 and 318 illustrated in FIG. 3D are the same as or substantially the same as those described above in FIG. 3C, a description thereof will be omitted. Although FIG. 3C shows that the user terminal 310 and the gateway (SIMBOX) 320 transmit and receive one RTP request message and one RTP response message to determine a transmission and reception time of an RTP message, whereas FIG. 3D shows that the user terminal 310 and the gateway (SIMBOX) 320 may transmit and receive a plurality of RTP request messages and a plurality of RTP response messages to determine a transmission and reception time of an RTP message.

The user terminal 310 may transmit a first RTP request message to the gateway (SIMBOX) 320 (315-1), and may receive a first RTP response message as a response to the first RTP request message from the gateway (SIMBOX) 320 (316-1). The user terminal 310 may transmit an nth RTP request message (where n is a natural number equal to or greater than 2) to the gateway (SIMBOX) 320 (315-n), and may receive an nth RTP response message as a response to the nth RTP request message from the gateway (SIMBOX) 320 (316-n).

The user terminal 310 may identify a first RTP response time from transmission of the first RTP request message to reception of the first RTP response message. The user terminal 310 may identify an nth RTP response time from transmission of the nth RTP request message to reception of the nth RTP response message. The user terminal 310 may calculate an average of the first RTP response time to the nth RTP response time, and may determine an RTP average response time. The user terminal 310 may identify a howling response time, which is a time from transmission of a howling generation sound source (e.g., the howling generation sound source ③ of FIG. 2) to reception of a howling response (e.g., the howling response message ④ of FIG. 2).

The user terminal 310 may compare the RTP average response time and the howling response time, and may determine whether a call is a normal call according to a comparison result. When a difference between the RTP average response time and the howling response time is greater than or equal to a threshold value, the user terminal 310 may determine the call between the user terminal 310 and the gateway (SIMBOX) 320 is an abnormal call (e.g., a call by voice phishing). When the difference between the RTP average response time and the howling response time is less than the threshold value, the user terminal 310 may determine the call between the user terminal 310 and the gateway (SIMBOX) 320 is a normal call.

The user terminal 310 may determine whether the call between the user terminal 310 and the gateway (SIMBOX) 320 is a normal call even during the call or after termination of the call by comparing the RTP average response time and the howling response time.

Figure 4A:
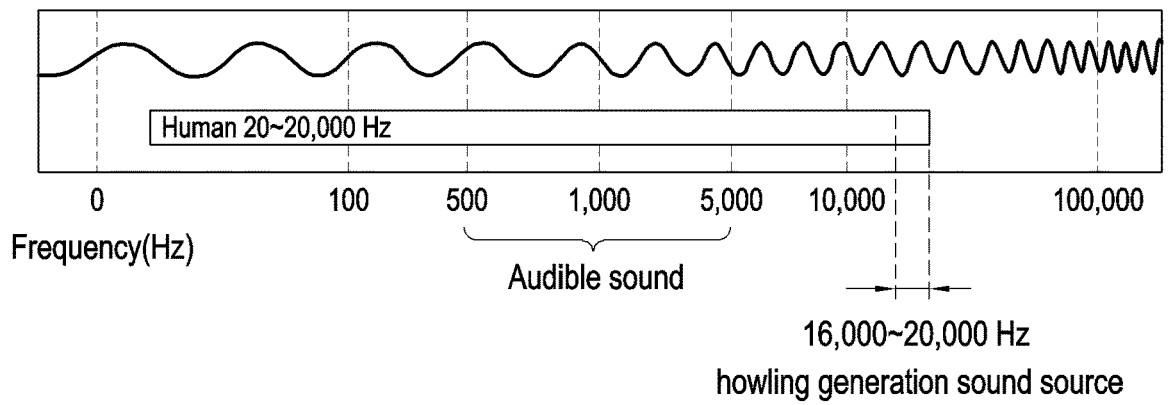
FIGS. 4A, 4B, and 4C are diagrams illustrating a howling generation sound source and a howling response according to an embodiment of the disclosure.
Figure 4B:
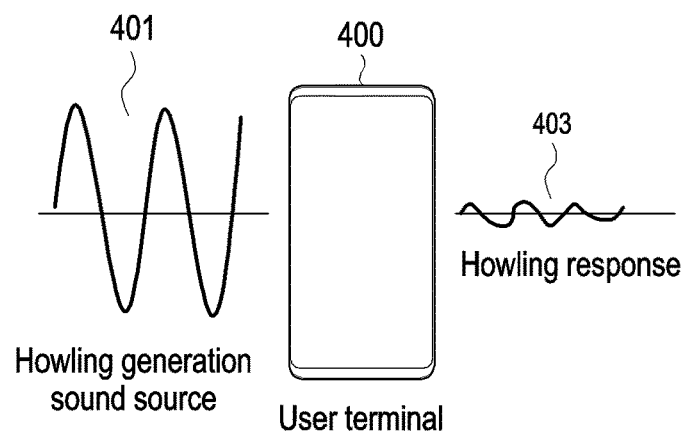
Figure 4C:
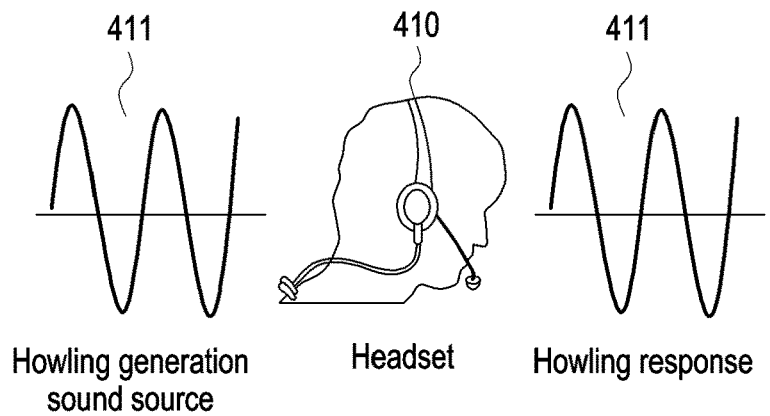

FIGS. 4A, 4B, and 4C are diagrams illustrating a howling generation sound source and a howling response according to embodiments of the disclosure.

Referring to FIG. 4A, a howling generation sound source (e.g., the howling generation sound source ③ of FIG. 2) generated in a user terminal (e.g., the user terminal 160 of FIG. 1, the user terminal 210 of FIG. 2, or the user terminal 310 of FIGS. 3A to 3D) may be configured to have a unique period corresponding to a frequency equal to or higher than a specific frequency (e.g., 16,000 Hz) within a human audible frequency range (20 to 20,000 Hz). For example, a frequency of 16,000 Hz or higher within the human audible frequency range (20 to 20,000 Hz) is difficult for a human to hear, but a receiver and a microphone of the user terminal may support communication through a frequency of 16,000 Hz or higher.

Referring to FIG. 4B, a user terminal 400 may include a multi-microphone, and may have an active noise canceling (ANC) function and/or a clear voice capture (cVc) function. When receiving a howling generation sound source 401, the user terminal 400 may transmit a howling response 403 with ambient noise of a call and/or howling removed through the ANC function and/or the cVc function to a counterpart terminal.

Referring to FIG. 4C, when a user wearing a headset 410 communicates, the headset 410 may include a single-microphone, and may not have an active noise canceling (ANC) function and/or a clear voice capture (cVc) function. When a howling generation sound source 411 is received through the headset 410, a device (e.g., the attacker PC 120 in FIG. 1) connected to the headset 410 may transmit a howling response 411 similar to the howling generation sound source 411 from which howling is not removed to a counterpart terminal.

When an attacker committing a criminal act, such as voice phishing, while wearing the headset 410, makes an Internet call to a user terminal (e.g., the user terminal 160 of FIG. 1) through an attacker PC (e.g., the attacker PC 120 in FIG. 1) located abroad, the attacker PC (e.g., the attacker PC 120 in FIG. 1) may transmit the howling response 411 similar to the howling generation sound source 411 from which howling is not removed to the user terminal.

Figure 5A:
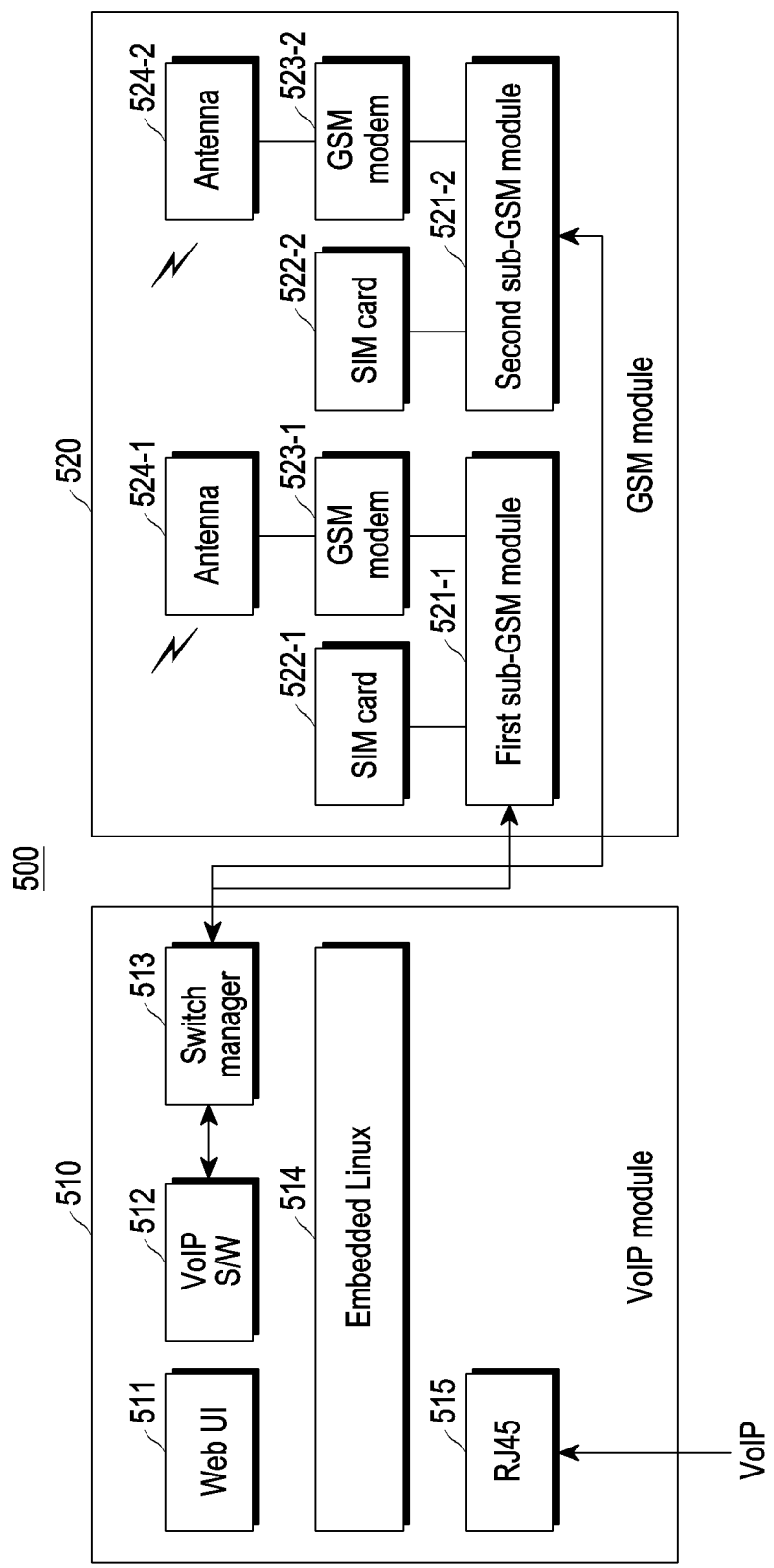
FIG. 5A is a block diagram illustrating a structure of a gateway (SIMBOX) according to an embodiment of the disclosure.

FIG. 5A is a block diagram illustrating a structure of a gateway (SIMBOX) according to an embodiment of the disclosure.

Figure 5B:
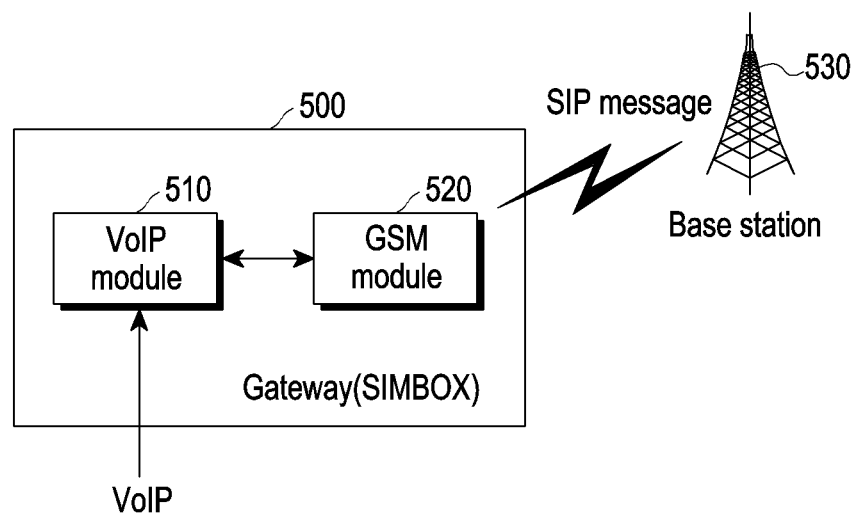
FIG. 5B is a diagram illustrating communication between a gateway (SIMBOX) and a base station according to an embodiment of the disclosure.

FIG. 5B is a diagram illustrating communication between a gateway (SIMBOX) and a base station according to an embodiment of the disclosure.

Referring to FIG. 5A, the gateway (SIMBOX) 500 (e.g., the gateway 140 of FIG. 1, the gateway 220 of FIG. 2, or the gateway 320 of FIGS. 3A to 3D) may include a VoIP module 510 supporting a VoIP (or Internet call) and a global system for mobile communication (GSM) module 520 supporting communication with a base station (e.g., the base station 150 of FIG. 1).

The VoIP module 510 may include a web UI 511, VoIP software 512, a switch manager 513, an embedded Linux 514, and an RJ45 connector 515. The VoIP module 510 may receive a VoIP signal transmitted from a VPN device (e.g., the VPN device 130 of FIG. 1) through the RJ45 connector 515, and may process the received VoIP signal.

The GSM module 520 may include a first sub-GSM module 521-1, a first subscriber identification module (SIM) card 522-1, a first GSM modem 523-1, a first antenna 524-1, a second sub-GSM module 521-2, a second SIM card 522-2, a second GSM modem 523-2, and a second antenna 524-2. Although FIGS. 5A and 5B show that the GSM module 520 includes two sub-GSM modules 521-1 and 521-2 for convenience of description, the technical spirit of the disclosure is not limited thereto and the GSM module 520 may include various numbers of sub-GSM modules.

The GSM module 520 may receive and process a VoIP signal, processed through the VoIP software 512 and the switch manager 513, through the first sub-GSM module 521-1. The GSM module 520 may transmit a VoLTE signal to the base station (e.g., the base station 150 of FIG. 1) via the first GSM modem 523-1 and the first antenna 524-1, based on information in a subscriber identity module configured in the first SIM card 522-1.

The GSM module 520 may receive and process a VoIP signal, processed through the VoIP software 512 and the switch manager 513, through the second sub-GSM module 521-2. The GSM module 520 may transmit a VoLTE signal to the base station via the second GSM modem 523-2 and the second antenna 524-2, based on information in a subscriber identification module configured in the second SIM card 522-2.

Referring to FIGS. 5A and 5B, the VoIP module 510 may receive a VoIP signal transmitted from the VPN device (e.g., the VPN device 130 of FIG. 1), and may process the received VoIP signal.

The first sub-GSM module 521-1 may transmit a SIP message for VoIP connection and/or termination to the base station 530 through the first antenna 524-1, based on first subscriber information included in the first SIM card 522-1.

The first sub-GSM module 521-1 may receive a SIP response message, which corresponds to the SIP message and is transmitted from an external electronic device, from the base station 530 through the first antenna 524-1. The first sub-GSM module 521-1 may process and/or store the SIP response message.

The second sub-GSM module 521-2 may transmit a SIP message for VoIP connection and/or termination to the base station 530 through the second antenna 524-2, based on second subscriber information included in the second SIM card 522-2. The second sub-GSM module 521-2 may receive a SIP response message, which corresponds to the SIP message and is transmitted from an external electronic device, from the base station 530 through the second antenna 524-1. The second sub-GSM module 521-2 may process and/or store the SIP response message.

Figure 6:
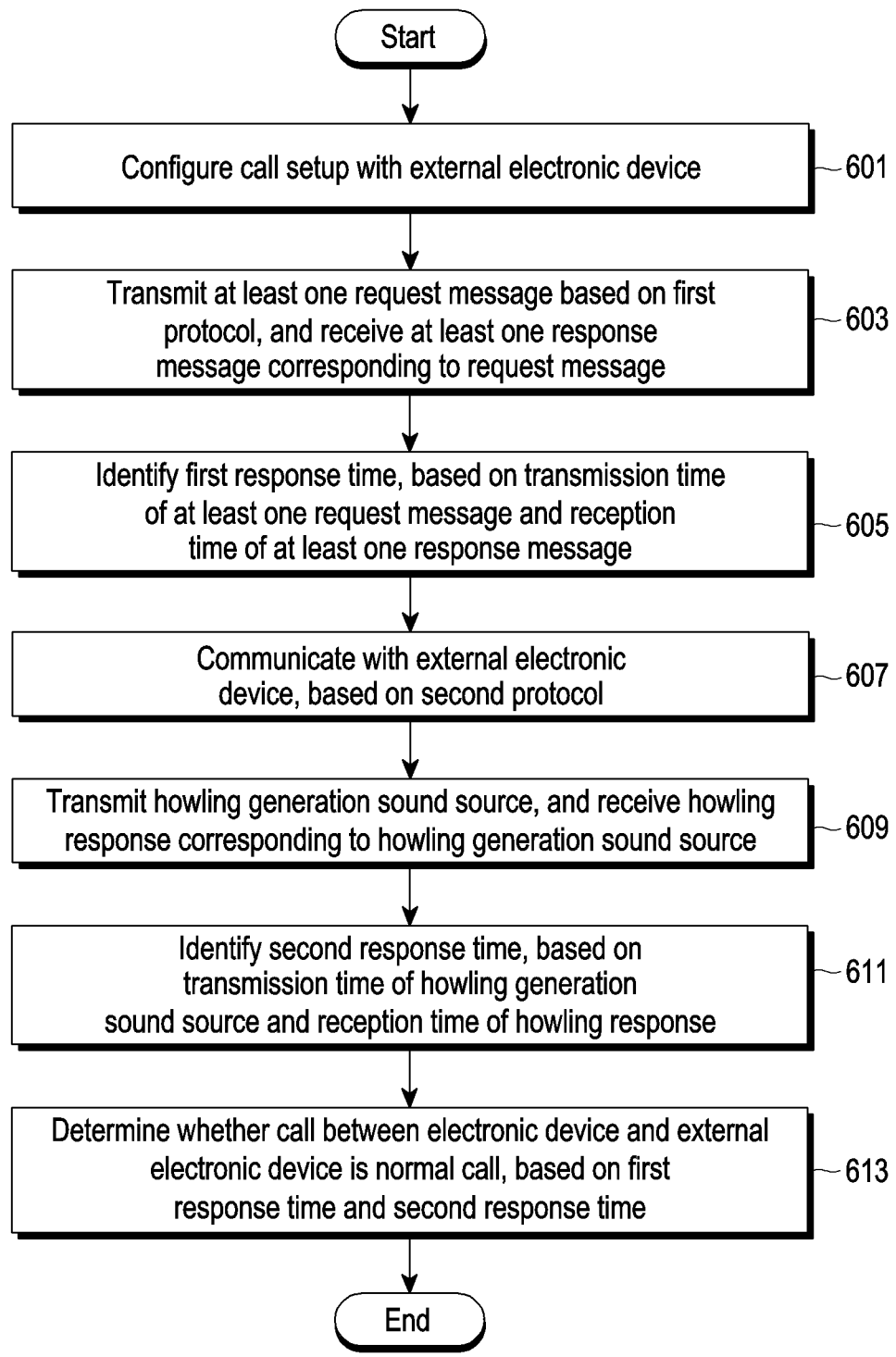
FIG. 6 is a flowchart illustrating an operation of an electronic device according to an embodiment of the disclosure.

FIG. 6 is a flowchart illustrating an operation of an electronic device according to an embodiment of the disclosure.

Referring to FIG. 6, the electronic device may configure a call setup with an external electronic device (601). The electronic device may configure the call setup with the external electronic device, based on a first protocol, and may communicate with the external electronic device, based on a second protocol.

The electronic device may transmit at least one request message, based on the first protocol, and may receive at least one response message corresponding to the request message (603). The first protocol may be a session initiation protocol (SIP) or a real-time transport protocol (RTP). When the first protocol is the SIP, the at least one request message may be a SIP option message for identifying a capability of the external electronic device, and the at least one response message may be a SIP option response message. When the first protocol is the SIP, the at least one request message may be a dummy message, and the at least one response message may be a dummy response message.

The electronic device may identify a first response time, based on a transmission time of the at least one request message and a reception time of the at least one response message (605).

The electronic device may communicate with the external electronic device, based on the second protocol (607). According to an embodiment of the disclosure, the first protocol may be the session initiation protocol (SIP), and the second protocol may be a real-time transport protocol (RTP). According to an embodiment of the disclosure, both the first protocol and the second protocol may be the RTP. The external electronic device may be configured as a gateway forging an incoming call number of an Internet call.

The electronic device may transmit a howling generation sound source, and may receive a howling response corresponding to the howling generation sound source (609). The electronic device may generate the howling generation sound source to have a unique period corresponding to a frequency equal to or higher than a preset frequency within a user's audible frequency range. The electronic device may identify a second response time, based on a transmission time of the howling generation sound source and a reception time of the howling response (611). The electronic device may adjust the second response time, based on a delay according to a characteristic of the howling generation sound source and a delay in a codec used in a VoLTE.

The electronic device may determine whether a call between the electronic device and the external electronic device is a normal call, based on the first response time and the second response time (613). A detailed description of operation 613 is described below with reference to FIG. 7.

The electronic device may perform control to transmit a first request message based on the first protocol, and may receive a first response message corresponding to the first request message. According to various embodiments, the electronic device may perform control to transmit a second request message based on the first protocol, and may receive a second response message corresponding to the second request message.

The electronic device may calculate an average response time of a response time based on a transmission time of the first request message and a reception time of the first response message and a response time based on a transmission time of the second request message and a reception time of the second response message. The electronic device may determine the average response time as the first response time.

Figure 7:
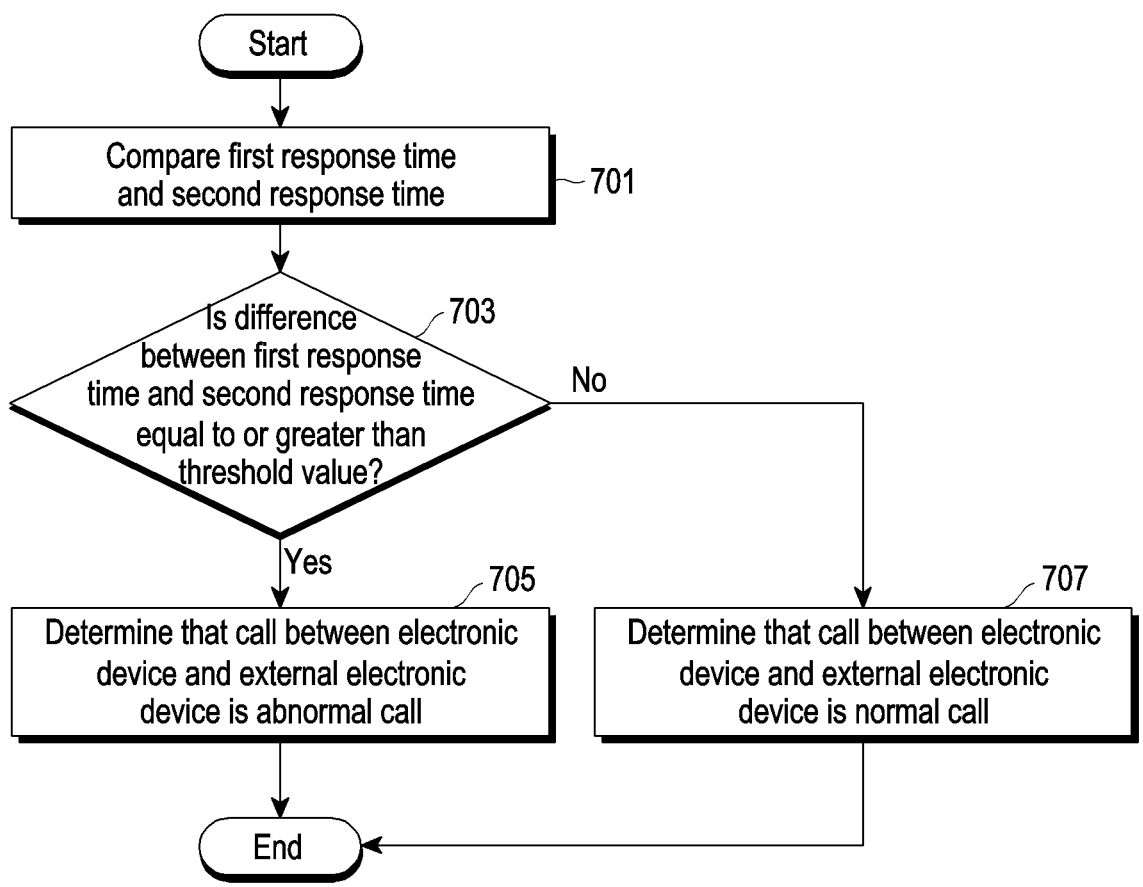
FIG. 7 is a flowchart illustrating an operation of an electronic device according to an embodiment of the disclosure.

FIG. 7 is a flowchart illustrating an operation of an electronic device according to an embodiment of the disclosure.

Referring to FIG. 7, the electronic device may compare the first response time and the second response time (701). The electronic device may determine whether a difference between the first response time and the second response time is equal to or greater than a threshold value (703). The threshold value may be configured based on a transmission delay on a network.

When the difference between the first response time and the second response time is equal to or greater than the threshold value, the electronic device may determine that the call between the electronic device and the external electronic device is an abnormal call (705). When the difference between the first response time and the second response time is less than the threshold value, the electronic device may determine that the call between the electronic device and the external electronic device is a normal call (707).

Figure 8:
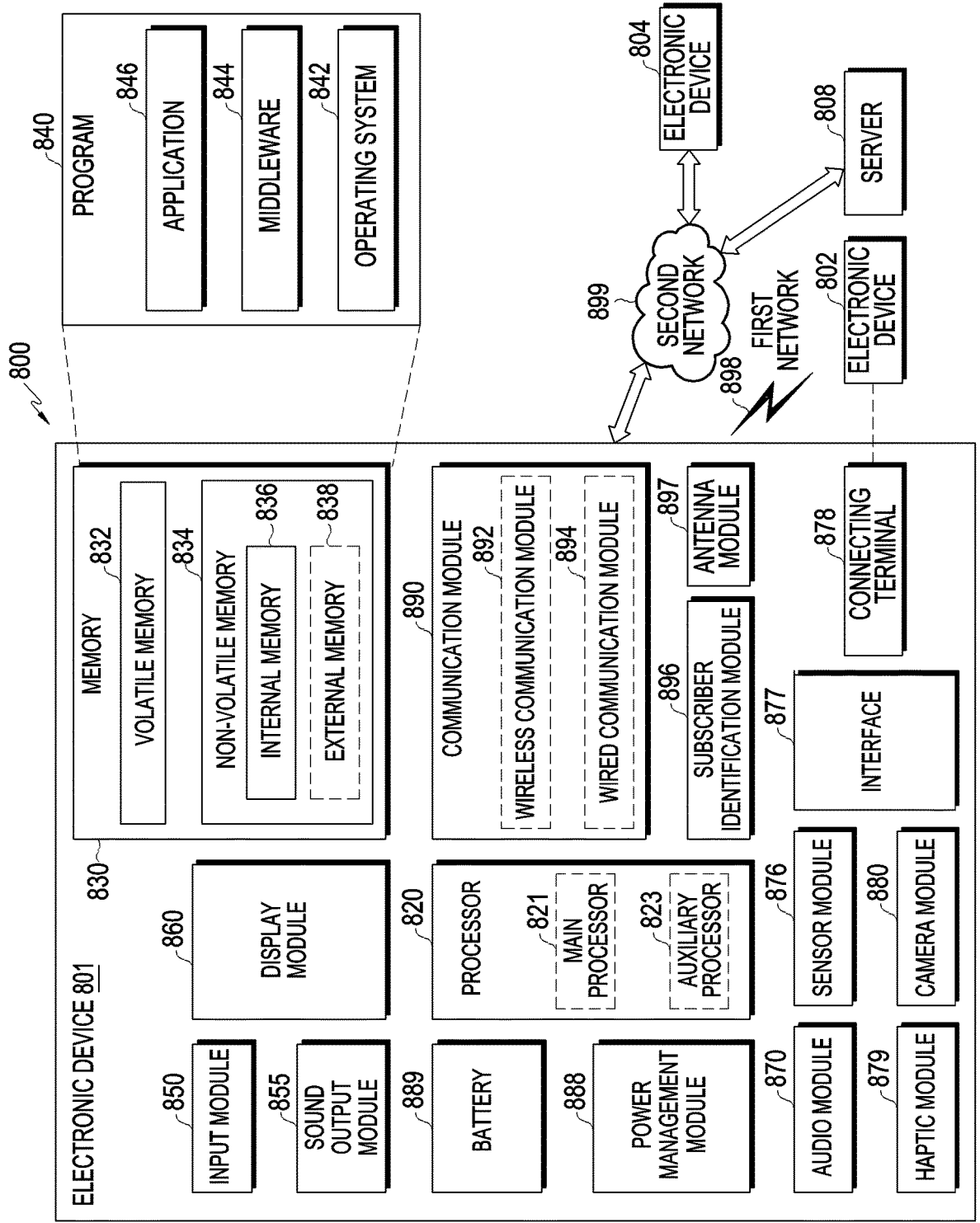
FIG. 8 is a block diagram schematically illustrating an electronic device 801 in a network environment according to an embodiment of the disclosure.

FIG. 8 is a block diagram schematically illustrating an electronic device 801 in a network environment 800 according to embodiment of the disclosure.

The electronic device 801 of FIG. 8 may be the same as or substantially the same as the user terminal 160 of FIG. 1, the user terminal 210 of FIG. 2, or the user terminal 310 of FIGS. 3A to 3D.

Referring to FIG. 8, in the network environment 800, the electronic device 801 may communicate with an electronic device 802 via a first network 898 (e.g., a short-range wireless communication network), or may communicate with an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, a memory 830, an input module 850, a sound output module 855, a display module 860, an audio module 870, a sensor module 876, an interface 877, a connection terminal 878, a haptic module 879, a camera module 880, a power management module 888, a battery 889, a communication module 890, a subscriber identity module 896, or an antenna module 897. According to an embodiment, at least one (e.g., the connection terminal 878) of these components may be omitted, or one or more other components may be further included in the electronic device 801. In an embodiment, some (e.g., the sensor module 876, the camera module 880, or the antenna module 897) of these components may be integrated into one component (e.g., the display module 860).

The processor 820 may run, for example, software (e.g., a program 840) to control at least one other component (e.g., a hardware or software component) of the electronic device 801 connected to the processor 820, and may perform various types of data processing or arithmetic operations. According to an embodiment, as at least part of the data processing or operations, the processor 820 may store a command or data received from another component (e.g., the sensor module 876 or the communication module 890) in a volatile memory 832, may process the command or data stored in the volatile memory 832, and may store the resulting data in a nonvolatile memory 834. According to an embodiment, the processor 820 may include a main processor 821 (e.g., a central processing unit or an application processor) or a coprocessor 823 (e.g., a graphics processing unit, a neural processing unit (NPU), an image signal processor, a sensor hub processor, or a communications processor) that is operable independently of or together with the main processor 821. For example, when the electronic device 801 includes the main processor 821 and the coprocessor 823, the coprocessor 823 may be configured to use lower power than the main processor 821 or to specialize in a designated function. The coprocessor 823 may operate separately from the main processor 821 or as a part thereof.

The coprocessor 823 may control at least some of the functions or states associated with at least one component (e.g., the display module 860, the sensor module 876, or the communication module 890) among the components of the electronic device 801, for example, instead of the main processor 821 when the main processor 821 is in an inactive (e.g., sleep) state, or along with the main processor 821 when the main processor 821 is in an active (e.g., application-running) state. According to an embodiment, the coprocessor 823 (e.g., an image signal processor or a communications processor) may be configured as a part of another functionally related component (e.g., the camera module 880 or the communication module 890). According to an embodiment, the coprocessor 823 (e.g., the neural processing unit) may include a hardware structure specializing in processing an artificial intelligence model. An artificial intelligence model may be generated by machine learning. This learning may be performed, for example, by the electronic device 801 where artificial intelligence is performed or via a separate server (e.g., the server 808). Learning algorithms may include, for example, supervised learning, unsupervised learning, semi-supervised learning, or reinforcement learning. The artificial intelligence model may include a plurality of artificial neural network layers, but are not limited thereto. An artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The artificial intelligence model may additionally or alternatively include a software structure other than the hardware structure.

The memory 830 may store various data used by at least one component (e.g., the processor 820 or the sensor module 876) of the electronic device 801. The data may include, for example, software (e.g., the program 840), and input data or output data about a command associated with the software. The memory 830 may include the volatile memory 832 or the nonvolatile memory 834.

The program 840 may be stored as software in the memory 830 and may include, for example, an operating system 842, middleware 844, or an application 846.

The input module 850 may receive a command or data to be used for a component (e.g., the processor 820) of the electronic device 801 from the outside (e.g., a user) of the electronic device 801. The input module 850 may include, for example, a microphone, a mouse, a keyboard, a key (e.g., a button), or a digital pen (e.g., a stylus pen).

The sound output module 855 may output a sound signal to the outside of the electronic device 801. The sound output device 855 may include, for example, a speaker or a receiver. The speaker may be employed for general use, such as for multimedia playback or recording playback. The receiver may be used for receiving an incoming call. According to an embodiment, the receiver may be configured separately from the speaker or as a part of the speaker.

The display module 860 may visually provide information to the outside (e.g., a user) of the electronic device 801. The display module 860 may include, for example, a display, a hologram device, or a projector and a control circuit for controlling a corresponding device. According to an embodiment, the display module 860 may include a touch sensor configured to detect a touch or a pressure sensor configured to measure the strength of force generated by the touch.

The audio module 870 may convert a sound into an electrical signal, or, conversely, an electrical signal into a sound. According to an embodiment, the audio module 870 may obtain a sound through the input module 850, or may output a sound through the audio output module 855 or an external electronic device (e.g., the electronic device 802 (e.g., a speaker or a headphone)) connected directly or wirelessly to the electronic device 801.

The sensor module 876 may detect an operating state (e.g., power or temperature) of the electronic device 801 or an external environmental condition (e.g., a user's condition) and may generate an electrical signal or a data value corresponding to the detected state. According to an embodiment, the sensor module 876 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 877 may support one or more designated protocols that can be used for the electronic device 801 to be directly or wirelessly connected to an external electronic device (e.g., the electronic device 802). According to an embodiment, the interface 877 may include, for example, a High-Definition Multimedia Interface (HDMI), a Universal Serial Bus (USB) interface, a secure digital (SD) card interface, or an audio interface.

The connection terminal 878 may include a connector through which the electronic device 801 is physically connectable to an external electronic device (e.g., the electronic device 802). According to an embodiment, the connection terminal 878 may include, for example, an HDMI connector, a USB connector, an SD card connector, or an audio connector (e.g., a headphone connector).

The haptic module 879 may convert an electrical signal into a mechanical stimulus (e.g., vibrations or a movement) or an electrical stimulus that is perceivable by the user through a tactile sensation or the sense of movement. According to an embodiment, the haptic module 879 may include, for example, a motor, a piezoelectric element, or an electrical stimulation device.

The camera module 880 may capture a still image and a moving image. According to an embodiment, the camera module 880 may include one or more lenses, image sensors, image signal processors, or flashes.

The power management module 888 may manage the power supplied to the electronic device 801. According to an embodiment, the power management module 888 may be configured, for example, as at least a part of a power management integrated circuit (PMIC).

The battery 889 may supply power to at least one component of the electronic device 801. According to an embodiment, the battery 889 may include, for example, a non-rechargeable primary battery, a rechargeable secondary battery, or a fuel cell.

The communication module 890 may support establishing a direct (e.g., wired) communication channel or a wireless communication channel between the electronic device 801 and an external electronic device (e.g., the electronic device 802, the electronic device 804, or the server 808) and performing communication through the established communication channel. The communication module 890 may include one or more communication processors that operate independently of the processor 820 (e.g., an application processor) and support direct (e.g., wired) communication or wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power-line communication module). Among these communication modules, a corresponding communication module may communicate with the external electronic device 804 via the first network 898 (e.g., a short-range communication network including a Bluetooth, wireless fidelity (Wi-Fi) direct, or infrared data association (IrDA) network) or the second network 899 (e.g., a long-range communication network including a legacy cellular network, a fifth generation (5G) network, a next-generation communication network, the Internet, or a computer network (e.g., a LAN or wide area network (WAN))). These various types of communication modules may be integrated into one component (e.g., a single chip) or may be configured as a plurality of separate components (e.g., a plurality of chips). The wireless communication module 892 may identify or authenticate the electronic device 801 within a communication network, such as the first network 898 or the second network 899, using subscriber information (e.g., an international mobile subscriber identity (IMSI)) stored in the subscriber identity module 896.

The wireless communication module 892 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 892 may support a high-frequency band (e.g., a millimeter wave (mmWave) band) to achieve, for example, a high data transmission rate. The wireless communication module 892 may support various technologies for securing performance on a high-frequency band, for example, beamforming, massive multiple-input and multiple-output (massive MIMO), full dimensional MIMO (FD-MIMO), array antenna, analog beam-forming, or large scale antenna. The wireless communication module 892 may support various requirements prescribed for the electronic device 801, an external electronic device (e.g., the electronic device 804), or a network system (e.g., the second network 899). According to an embodiment, the wireless communication module 892 may support a peak data rate (e.g., 20 Gbps or more) for implementing eMBB, loss coverage (e.g., 164 dB or less) for implementing mMTC, or U-plane latency (e.g., 0.5 ms or less for each of a downlink (DL) and an uplink (UL), or a round trip of 1 ms or less) for implementing URLLC.

The antenna module 897 may transmit a signal or power to the outside (e.g., an external electronic device) or may receive a signal or power from the outside. According to an embodiment, the antenna module 897 may include an antenna including a radiating element of a conductor or a conductive pattern, which is formed on a substrate (e.g., a printed circuit board (PCB)). According to an embodiment, the antenna module 897 may include a plurality of antennas (e.g., array antennas). In this case, at least one antenna suitable for a communication mode used for a communication network, such as the first network 898 or the second network 899, may be selected, for example, by the communication module 890, from among the plurality of antennas. A signal or power may be transmitted or received between the communication module 890 and an external electronic device via the at least one selected antenna. According to an embodiment, a component (e.g., a radio frequency integrated circuit (RFIC)) other than the radiating element may be additionally formed as a part of the antenna module 897.

According to various embodiments, the antenna module 897 may form a mmWave antenna module. According to an embodiment, the mmWave antenna module may include a printed circuit board, an RFIC disposed on a first surface (e.g., a lower surface) of the printed circuit board or adjacent to the first surface and capable of supporting a designated high-frequency band (e.g., a mmWave band), and a plurality of antennas (e.g., array antennas) disposed on a second surface (e.g., an upper or side surface) of the printed circuit board or adjacent to the second surface and capable of transmitting or receiving signals in the designated high-frequency band.

At least some of the components may be connected to each other via a communication mode between peripheral devices (e.g., a bus, general-purpose input and output (GPIO), serial peripheral interface (SPI), or mobile industry processor interface (MIPI)) and may exchange signals (e.g., a command or data) with each other.

According to an embodiment, a command or data may be transmitted or received between the electronic device 801 and the external electronic device 804 via the server 808 connected to the second network 899. Each of the external electronic devices 802 and 804 may be a device of the same kind or a different kind from the electronic device 801. According to an embodiment, all or some operations performed by the electronic device 801 may be performed by one or more external electronic devices among the external electronic devices 802, 804, or 808. For example, when the electronic device 801 needs to perform a function or a service automatically or upon request from a user or another device, the electronic device 801 may, instead of or in addition to autonomously executing the function or the service, request at least one or more external electronic devices to perform at least part of the function or the service. Upon receiving such a request, the one or more external electronic devices may execute the at least part of the requested function or service or an additional function or service associated with the request, and may transmit the result of execution thereof to the electronic device 801. The electronic device 801 may provide the result, as at least part of a response to the request, without any processing or via additional processing. To this end, for example, cloud computing, distributed computing, mobile edge computing (MEC), or client-server computing technologies may be used. The electronic device 801 may provide ultra low-latency services using, for example, distributed computing or mobile edge computing. In another embodiment, the external electronic device 804 may include an Internet-of-things (IoT) device. The server 808 may be an intelligent server using machine learning and/or a neural network. According to an embodiment, the external electronic device 804 or the server 808 may be included in the second network 899. The electronic device 801 may be applied to intelligent services (e.g., smart home, smart city, smart car, or healthcare), based on 5G communication technology or IoT-related technology.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 840) including one or more instructions that are stored in a storage medium (e.g., the internal memory 836 or external memory 838) that is readable by a machine (e.g., the electronic device 801). For example, a processor (e.g., the processor 820) of the machine (e.g., the electronic device 801) may invoke at least one of the one or more stored instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

What is claimed is:

1. An electronic device comprising:
communication circuitry;
memory, comprising one or more storage media, storing instructions; and
at least one processor communicatively coupled to the communication circuitry and the memory,
wherein the instructions, when executed by the at least one processor individually or collectively, cause the electronic device to:
configure a call setup with an external electronic device via the communication circuitry,
control the communication circuitry to transmit at least one request message based on a first protocol,
receive at least one response message corresponding to the at least one request message via the communication circuitry,
identify a first response time, based on a transmission time of the at least one request message and a reception time of the at least one response message,
control the communication circuitry to transmit a howling generation sound-source, receive a howling response corresponding to the howling generation sound via the communication circuitry,
identify a second response time, based on a transmission time of the howling generation sound and a reception time of the howling response, and
determine whether a call between the electronic device and the external electronic device is a normal call, based on the first response time and the second response time.

2. The electronic device of claim 1, wherein the first protocol is a session initiation protocol (SIP) or a real-time transport protocol (RTP).

3. The electronic device of claim 2,
wherein, in case that the first protocol is the SIP, the at least one request message is a SIP option message for identifying a capability of the external electronic device, and
wherein the at least one response message is a SIP option response message.

4. The electronic device of claim 2, wherein, in case that the first protocol is the SIP, the at least one request message is a dummy message and the at least one response message is a dummy response message.

5. The electronic device of claim 1, wherein the instructions, when executed by the one or more processors individually or collectively, further cause the electronic device to:
compare the first response time and the second response time,
according to a result of the comparison, in case that a difference between the first response time and the second response time is greater than or equal to a threshold value, determine that the call between the electronic device and the external electronic device is not the normal call, and
according to a result of the comparison, in case that the difference between the first response time and the second response time is less than the threshold value, determine that the call between the electronic device and the external electronic device is the normal call.

6. The electronic device of claim 5, wherein the threshold value is configured based on a transmission delay in a network.

7. The electronic device of claim 1, wherein the instructions, when executed by the one or more processors individually or collectively, further cause the electronic device to adjust the second response time, based on a delay according to a characteristic of the howling generation sound and a delay in a codec used in voice over long term evolution (VOLTE).

8. The electronic device of claim 1, wherein the instructions, when executed by the one or more processors individually or collectively, further cause the electronic device to:
control the communication circuitry to transmit a first request message based on the first protocol and receive a first response message corresponding to the first request message, and
control the communication circuitry to transmit a second request message based on the first protocol through the communication circuitry and receive a second response message corresponding to the second request message.

9. The electronic device of claim 8, wherein the instructions, when executed by the one or more processors individually or collectively, further cause the electronic device to:
calculate an average response time based on a transmission time of the first request message and a reception time of the first response message and a response time based on a transmission time of the second request message and a reception time of the second response message, and
determine the average response time as the first response time.

10. The electronic device of claim 1, wherein the instructions, when executed by the one or more processors individually or collectively, further cause the electronic device to:
configure the call setup with the external electronic device, based on the first protocol, and
communicate with the external electronic device, based on a second protocol.

11. The electronic device of claim 1, wherein the instructions, when executed by the one or more processors individually or collectively, further cause the electronic device to generate the howling generation sound to have a unique period corresponding to a frequency of a preset frequency or higher within an audible frequency range of a user.

12. The electronic device of claim 1, wherein the external electronic device is configured as a gateway forging an incoming call number of an internet call.

13. A method of an electronic device, the method comprising:
configuring a call setup with an external electronic device;
controlling communication circuitry of the electronic device to transmit at least one request message based on a first protocol;
receiving at least one response message corresponding to the at least one request message via the communication circuitry;
identifying a first response time, based on a transmission time of the at least one request message and a reception time of the at least one response message;
controlling the communication circuitry to transmit a howling generation sound;
receiving a howling response corresponding to the howling generation sound via the communication circuitry;
identifying a second response time, based on a transmission time of the howling generation sound and a reception time of the howling response; and
determining whether a call between the electronic device and the external electronic device is a normal call, based on the first response time and the second response time.

14. The method of claim 13, further comprising:
communicating with the external electronic device, based on a second protocol.

15. The method of claim 14, wherein the first protocol is a session initiation protocol (SIP) and the second protocol is a real-time transport protocol (RTP).

16. The method of claim 14, wherein the first protocol and the second protocol are both RTP.

17. The method of claim 13, further comprising:
comparing the first response time and the second response time;
according to a result of the comparison, in case that a difference between the first response time and the second response time is greater than or equal to a threshold value, determining that the call between the electronic device and the external electronic device is not the normal call; and
according to a result of the comparison, in case that the difference between the first response time and the second response time is less than the threshold value, determining that the call between the electronic device and the external electronic device is the normal call.

18. The method of claim 13, further comprising:

adjusting the second response time, based on a delay according to a characteristic of the howling generation sound and a delay in a codec used in voice over long term evolution (VOLTE).

19. The method of claim 13, further comprising:

transmitting a first request message based on the first protocol and receiving a first response message corresponding to the first request message; and transmitting a second request message based on the first protocol and receiving a second response message corresponding to the second request message.

20. The method of claim 19, further comprising:

calculating an average response time based on a transmission time of the first request message and a reception time of the first response message and a response time based on a transmission time of the second request message and a reception time of the second response message; and determining the average response time as the first response time.

* * * * *